No. 723,090. PATENTED MAR. 17, 1903.
R. WATSON.
STEERING MECHANISM FOR MOTOR VEHICLES.
APPLICATION FILED AUG. 22, 1902.
NO MODEL.

WITNESSES:
Percy C Bowen
C. W. Clement

INVENTOR
Robert Watson

UNITED STATES PATENT OFFICE.

ROBERT WATSON, OF WASHINGTON, DISTRICT OF COLUMBIA, ASSIGNOR TO PATRICK J. COLLINS AND CHRISTOPHER G. BOLAND, OF SCRANTON, PENNSYLVANIA.

STEERING MECHANISM FOR MOTOR-VEHICLES.

SPECIFICATION forming part of Letters Patent No. 723,090, dated March 17, 1903.

Application filed August 22, 1902. Serial No. 120,691. (No model.)

*To all whom it may concern:*

Be it known that I, ROBERT WATSON, a citizen of the United States, residing at Washington, in the District of Columbia, have invented certain new and useful Improvements in Steering Mechanism for Motor-Vehicles, of which the following is a specification.

The purpose of this invention is to provide steering mechanism for motor-vehicles by which the steering-wheels may be deflected simultaneously at different angles to the body of the vehicle, so that the wheels may revolve in arcs of different radii in turning corners.

Figure 1:
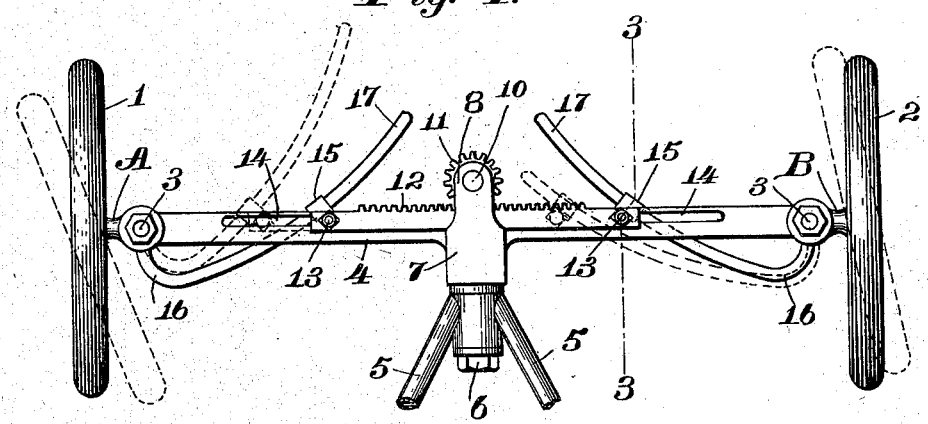
Figure 2:
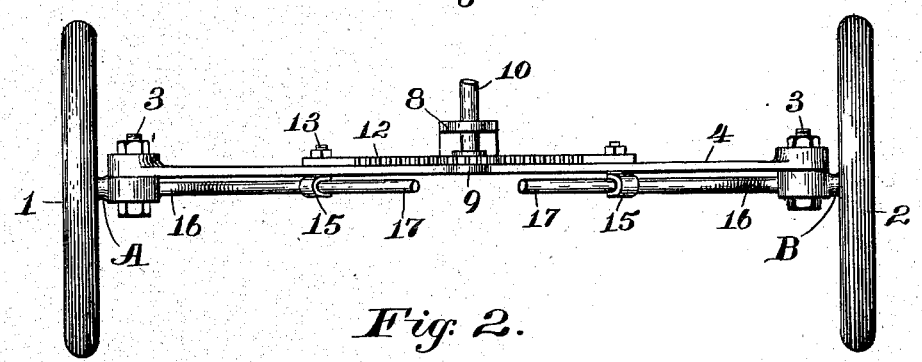
Figure 3:
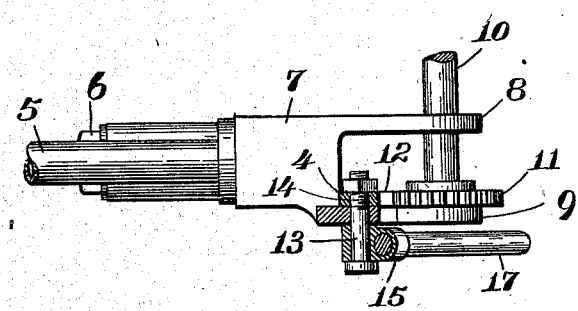

In the accompanying drawings, which illustrate the invention, Figure 1 is a plan view of the steering mechanism. Fig. 2 is a front elevation of the same, and Fig. 3 is a view taken on the line 3 3 of Fig. 1.

Referring to the drawings, 1 and 2 indicate the forward or steering wheels of a motor-vehicle, which rotate upon the ends of axles A and B, which axles are connected by pivot-bolts 3 to the ends of an axle-support 4. The reach-bars 5, which extend to the rear axle of the vehicle, are connected by a central pivot-bolt 6 to a bearing-block 7, which is formed integral with the axle-support and projects upwardly and rearwardly therefrom. An arm 8 projects forwardly from said bearing-block, and a similar arm 9 extends forwardly from the axle-support beneath the arm 8. A steering-post 10 is journaled in said arms and carries at its lower end a gear 11. Between said gear and the forward end of the bearing-block is arranged a rack-bar 12, having at its opposite ends studs 13, which extend through a longitudinal slot 14 in the axle-support and are pivotally connected to sleeves 15 upon the axles A and B. The axles, as shown, have portions 16 projecting rearwardly from their pivotal points, and the main portions 17 of the axles extend inwardly and forwardly in directions which are oblique to the line joining the pivotal points of connection of the bar 12 with said axles. The sliding bar 12 is arranged so that its points of engagement with the axles are intermediate of the ends of the parts 17 when the axles are in their normal positions. (Shown in full lines in Fig. 1.) It is essential that the oblique portions 17 of the axles should extend across the line joining their points of connection with the bar 12 when the parts are in their normal positions. The bar 12, however, may be arranged in advance or in the rear of the position in which it is shown. The pinion 11 engages the rack 12, and when the steering-bar 10 is turned the sliding bar 12 is moved longitudinally. When the sliding bar is moved, the sleeves 15 slide along the inclined portions 17 of the axles, and the latter are thereby turned about their pivotal points. The sleeve upon one axle will thus be moved toward the free end of the axle, while the sleeve upon the other axle will move toward its pivotal end, and the wheels will therefore turn on arcs of different radii. As shown in dotted lines in Fig. 1, when the bar 12 is moved to the left the sleeve upon the axle A moves toward the pivotal end of the axle, thus shortening the leverage and increasing the angular movement of the wheel 1 as the bearing moves toward the left, while the sleeve upon the axle B slides toward the free end of said axle, thus increasing the leverage and giving a shorter angular movement to said axle and the wheel 2 as the bar 12 moves to the left. When the bar 12 is moved to the right of the center, the wheel 2 is given a greater angular movement than the wheel 1. In the central position of the bar the wheels lie in parallel planes, as shown in full lines in Fig. 1.

Any suitable means may be employed for moving the connecting-bar 12, and said bar may be connected in sliding engagement with the axles by other means than the sleeves and studs shown.

The parts 17 of the axles are preferably slightly curved, as shown, although they may be made straight.

Having described my invention, what I claim as new, and desire to secure by Letters Patent, is—

1. In a motor-vehicle, the combination with a pair of pivoted axles, of a movable bar having a sliding connection with both of said axles, the parts of the axles which are connected to the bar lying normally in directions oblique to the line joining the connecting-points of the bar.

2. In a motor-vehicle, the combination with a pair of pivoted axles, of a longitudinally-movable bar having a sliding connection with both of said axles, and a guideway for said bar, the parts of the axles which are connected to the bar lying normally in directions oblique to the line joining the connecting-points of the bar.

3. In a motor-vehicle, the combination with an axle-support and a pair of axles pivoted to the opposite ends of said support, of a bar carried by said support and movable longitudinally thereof and having a sliding connection with both of said axles, the parts of the axles which are connected to the bar lying normally in directions oblique to the line joining the connecting-point of the bar.

4. In a motor-vehicle, the combination with a pair of pivoted axles, of a rack-bar having a sliding connection with both of said axles, the parts of the axles which are connected to the bar lying normally in directions oblique to the line joining the connecting-points of the bar, a steering-shaft and a pinion upon said shaft engaging said rack-bar.

5. In a motor-vehicle, a pair of pivoted axles, each having parts inclined inwardly and forwardly, a bar movable transversely of the vehicle and having a sliding connection with both axles at points intermediate of the ends of said inclined parts, and means for moving said bar transversely of the vehicle.

In testimony whereof I affix my signature in presence of two witnesses.

ROBERT WATSON.

Witnesses:
 C. A. NEALE,
 L. I. JONES.